United States Patent
Pawlenko et al.

(10) Patent No.: US 6,460,379 B2
(45) Date of Patent: Oct. 8, 2002

(54) MCVD APPARATUS HAVING TWO OPPOSING MOTORS TO ELIMINATE BACKLASH IN BURNER MOTION

(75) Inventors: Ivan Pawlenko, Holland, PA (US); Peter Michael Mueller, Suwanee, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/427,392

(22) Filed: Oct. 25, 1999

(65) Prior Publication Data

US 2002/0116957 A1 Aug. 29, 2002

(51) Int. Cl.[7] ............................................. C03B 37/018
(52) U.S. Cl. ............................. 65/484; 65/530; 65/532; 65/417
(58) Field of Search .......................... 65/530, 532, 484, 65/377, 417, 418, 489

(56) References Cited

U.S. PATENT DOCUMENTS

| | | | | |
|---|---|---|---|---|
| 4,231,777 A | * | 11/1980 | Lynch | 65/417 |
| 4,389,231 A | * | 6/1983 | Partus | 65/417 |
| 4,405,655 A | * | 9/1983 | Tuin | 65/417 |

FOREIGN PATENT DOCUMENTS

| | | | | |
|---|---|---|---|---|
| DE | 3925945 | * | 2/1991 | 65/417 |
| GB | 2067181 | * | 8/1981 | 65/417 |
| JP | 53143624 | * | 12/1978 | 65/417 |
| JP | 60260439 | * | 12/1985 | 65/377 |

* cited by examiner

Primary Examiner—John Hoffmann
(74) Attorney, Agent, or Firm—Henry I. Schanzer (57) ABSTRACT

In accordance with the invention, a preform from which fiber optics are drawn is fabricated by supplying reactants and gas vapors to the preform and by using two opposing forces to control the movement of a heat source supplying heat to the preform. The two forces function to reduce any hesitation or backlash in the movement of the heat source along predetermined portions of the preform to enable uniform layers to be formed within the preform.

17 Claims, 4 Drawing Sheets

MCVD APPARATUS HAVING TWO OPPOSING MOTORS TO ELIMINATE BACKLASH IN BURNER MOTION

BACKGROUND OF THE INVENTION

This invention relates to the fabrication of optic fibers and, in particular, to the fabrication of glass "preforms" from which optic fibers are formed by known fiber pulling and drawing processes.

This application incorporates by reference the teachings of application Ser. No. 09/427,393 U.S. Pat. No. 6,349,606 entitled "Reduced Backlash Translating System" filed this Oct. 25, 1999 simultaneously with the filing of this application.

Figure 4:
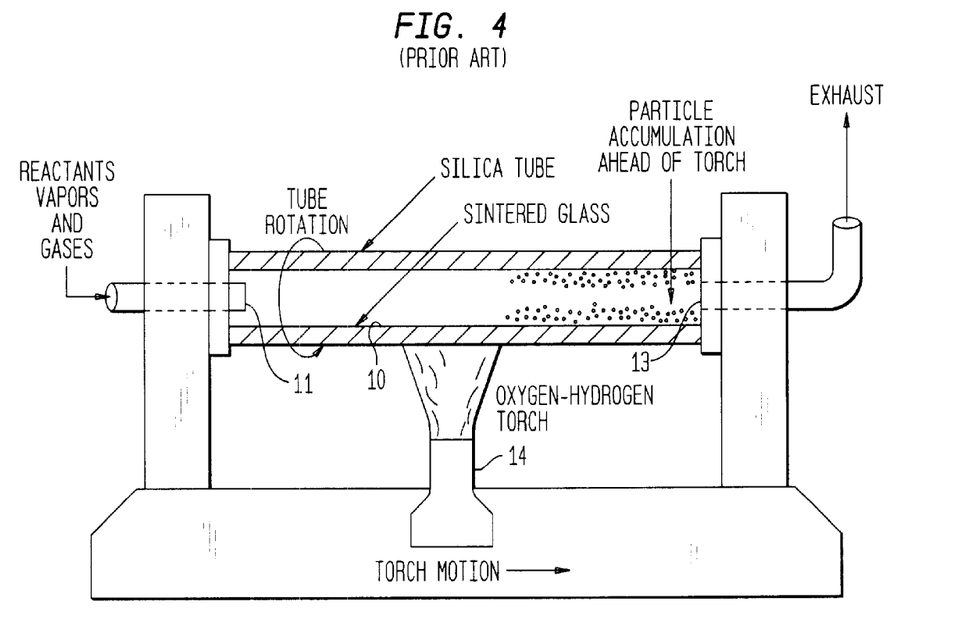
FIG. 4 is a simplified perspective view of a prior art system for forming a glass preform.

Known systems and processes for forming glass preforms suffer from certain problems which may be better explained by reference to FIG. 4. FIG. 4 shows a preform tube 10 (also referred to as a "starter tube") used to form optic fibers having an inlet end 11 and an exhaust end 13. Reactants vapors and gases are introduced at the inlet end 11 of the starter tube 10 and flow through the tube which is being rotated. As the chemical vapors flow through the starter tube 10 an oxygen-hydrogen torch 14 slowly travels from left to right (inlet end 11 to outlet end 13) and then from right to left (outlet end 13 to inlet end 11), along the length of the tube. The chemical vapor mixture undergoes a chemical reaction in the hot zone, near the torch, in which the incoming vapors form oxides. The chemical reactions produce microscopic glassy particles or "soot" that collect on the inside surface of the starter tube downstream from the hot zone and take the appearance of a thin porous sooty layer. Byproducts of the reaction together with the soot that does not deposit on the tube, flow out of the exhaust end of the tube. As the torch moves along the tube, the intense heat it generates causes the individual soot particles to be sintered into a continuous glassy layer. The torch is caused to pass back and forth along the length of the starter tube to cause layers upon layers to be formed, until the starter tube is filled.

In order to ensure that the layers formed are uniform, the torch must be moved along the full length of the starter tube in a very controlled, continuous, manner. However, several problems exist in achieving this goal, particularly at the ends of the tube, which may be best described as follows. As the torch is moved between the two ends of its travel it is repeatedly decelerated and brought to a stop at one end and then accelerated to a selected uniform speed until it comes close to the other end at which point it is decelerated and stopped at the other end before the process is repeated. Thus, at each end of travel, there is a problem due to the non-uniform application of heat to the tube. In addition, any momentary hesitation ("backlash") in the travel of the torch, for whatever reason, causes more heat to be generated at the point of hesitation resulting in a non-uniformity in the glass layer at that point. The non-uniformity (difference) may render defective and useless the entire starter tube. When it is realized that many hours (e.g., 6 hours) may be required to fill a starter tube and that significant material and labor costs are associated with the manufacture of each tube, it becomes clear that having to discard a starter tube, even when partially filled, results in significant economic and energy losses.

Applicants' invention is directed to reducing defects occurring in the fabrication of starter tubes due to hesitation and backlash of the heat source as it travels along the length of the tubes.

SUMMARY OF THE INVENTION

A system for fabricating a preform in accordance with the invention includes supplying reactants and gas vapors to the preform and the use of two opposing forces to control the movement of a heat source supplying heat to the preform. The two forces function to reduce any hesitation or backlash in the movement of the heat source along predetermined portions of the preform to enable uniform layers to be formed within the preform.

In one embodiment of the invention, a system for forming a glass preform tube in accordance with known fabrication processes includes two opposing forces which are simultaneously applied to first and second motorized assemblies for causing movement of the heat source axially back and forth along the tube. The actual rate of movement of the heat source is a function of the two forces. Along the length of the tube between the ends of the path of travel of the heat source, the effect of the forces is to preferably provide a constant first amplitude for a fixed rate of travel of the heat source corresponding to a first fixed flow rate of reactant chemicals through the tube. At the ends of the path of travel of the heat source, the amplitudes of two opposing sources are varied relative to one another such that the sum of the two forces first decreases to zero in accordance with a preselected deceleration function and then increases from zero to the first amplitude in accordance with a preselected acceleration function, such that the heat source is applied uniformly over the length of the preform tube.

In a system embodying the invention, simultaneously with the variation of the two forces, the rate of flow of the reactant chemicals is first decreased and then increased according to flow rate variation functions corresponding to the deceleration and acceleration functions of the sum of forces, respectively. Preferably, each of the opposing forces never decreases to a value below a threshold value sufficient, by itself, to overcome standing friction of the heat source and for causing movement of the heat source from a stationary condition.

In a system embodying the invention, two opposing forces are applied to first and second motorized assemblies whose movements are sensed for controlling the movement of the motorized assemblies and the profile of the reactants and vapor gases supplied to the preform tube.

BRIEF DESCRIPTION OF THE DRAWINGS

In the accompanying drawings like reference characters denote like components.

DETAILED DESCRIPTION OF PREFERRED EMBODIMENTS

Figure 1:
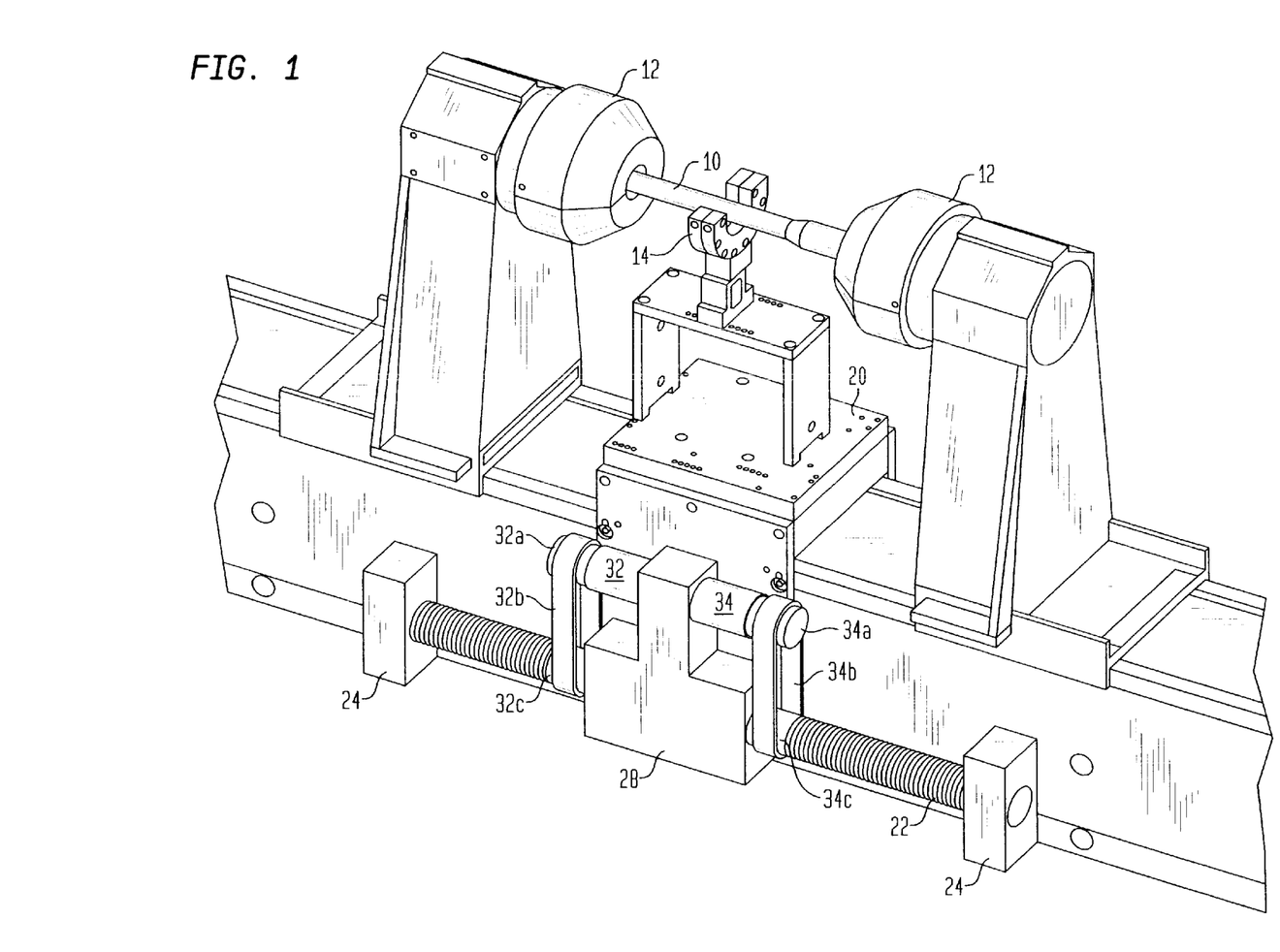
FIG. 1 is a view, in perspective, of a generally known lathe type apparatus modified according to the present invention.

FIG. 1 shows a lathe-type apparatus making use of the present invention. An elongated glass tubing 10 is supported between two chucks 12. Reactant gasses are passed through the tubing between the chucks for the deposition of soot particles on the tubing walls. A controlled conversion of the soot particles into layers of glass is obtained in response to controlled heating of the tube by flames from a gas burner 14 travelling back and forth along the tube length. In certain processes, e.g., the formation of an optic fiber glass preform made in apparatus of the type herein shown, precision movement of the gas burner 14 back and forth along the tubing is essential. Although the burner 14 must change speed upon each reversal of direction, provided no backlash is present, the rates of speed change can be known and compensated for by other changes in the processing, e.g., by the rates of gas flow through the tubing. The present invention provides means for driving the burner 14 back and forth along the tubing 10 essentially without any backlash. Also, in a preferred embodiment, not only is backlash avoided, but improvement in the control of the rate of movement of the carriage along the entire length of its travel is obtained.

As shown in FIG. 1, the gas burner 14 is mounted on a carriage 20 mounted for being driven along a drive screw 22 by rotation of a nut (not visible in FIG. 1) along the drive screw 22. Either the screw or the nut can be rotated and, in either case, the carriage is inelastically connected to the nut for axial movement therewith. Mechanisms, such as used in lathes, drill presses and the like, can be used for mechanically interconnecting the screw driven nut to the carriage 20. In known apparatus, the drive screw is typically controllably rotated for linearly advancing a nut and attached carriage along the axis of the screw. Alternatively, a motor is coupled to the nut for rotating it for screwing it along the drive screw. In such case, a bearing is typically used for securing the carriage to the nut for free rotation of the nut relative to the carriage while linearly moving the carriage in exact correspondence with movement of the nut along the screw.

The present invention is relevant to how the nut (or nuts) used for moving the carriage is itself moved. In the embodiment illustrated in FIG. 1, a stationary drive screw 22 is used rigidly secured between two stationary blocks 24. A housing 28 is mounted for axial movement along the screw 22 by drive means, to be described, in threaded engagement with the screw. The housing 28 is rigidly secured to the carriage 20 on which the gas burner 14 is rigidly mounted. FIG. 1 shows one side of the carriage. The other side (not visible in FIG. 1) is slidably mounted on a shaft precisely parallel to the drive screw 22. Mounted on the housing 28 for movement therewith are two motors 32 and 34 used for driving the carriage 20. Each motor is independently operable by a known control means, not shown, and each motor provides two functions. One function is to continuously move the housing 28 and the carriage 20 in a respective direction axially along the drive screw 22. The other function of each motor is to serve as a brake for slightly resisting the movement of the housing 28 caused by the other motor.

Each motor 32 and 34 has, respectively, a drive shaft (not visible in FIG. 1) for turning a pulley 32a and 34a and a belt 32b and 34b. The two belts 32b and 34b drive respective pulleys 32c and 34c for transmitting torque developed by the respective motors 32 and 34 to carriage driving means disposed within the housing 28.

Figure 2:
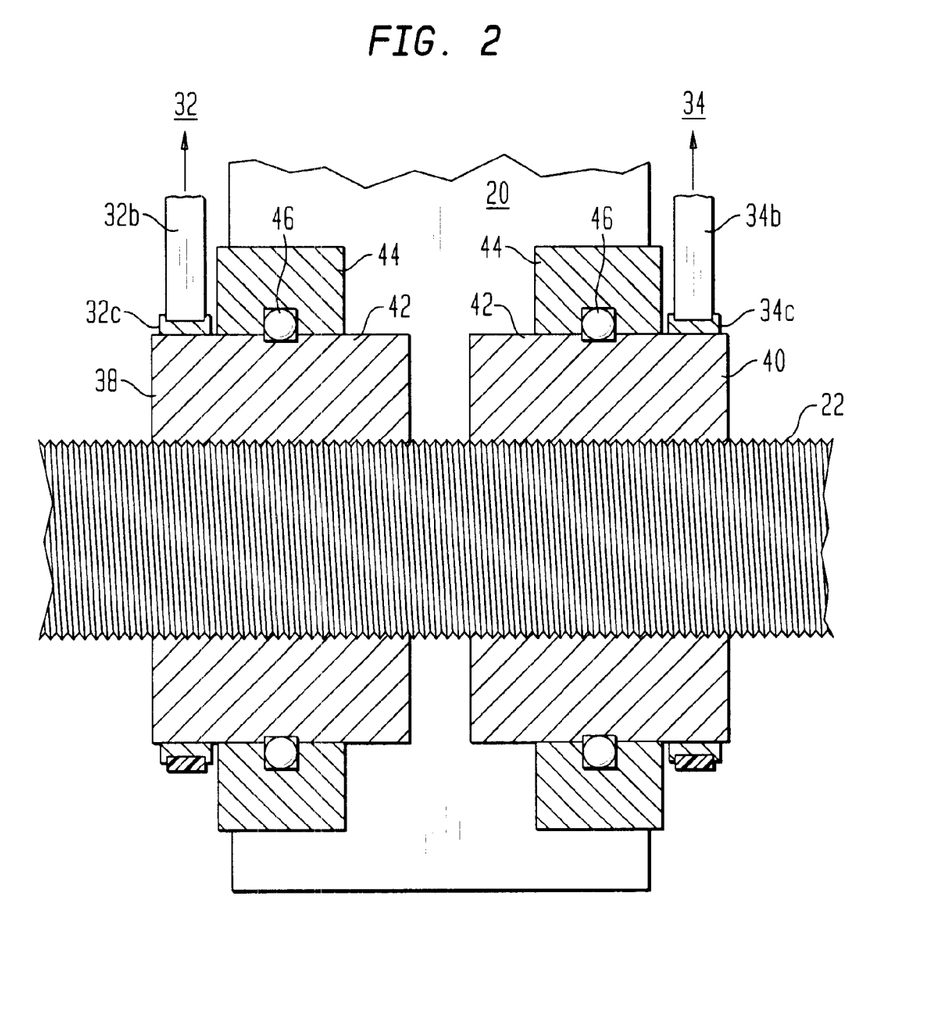
FIG. 2 is a side sectional view of a torque transmitting mechanism in accordance with one embodiment of the invention; the mechanism being disposed within a housing shown in FIG. 1.

FIG. 2 shows one embodiment of a carriage driving means which can be disposed within the housing 28 shown in FIG. 1. The driving means comprises two ball nuts 38 and 40 of known type each comprising, in accordance with known technology, an inner, internally threaded cylinder 42 and an outer cylinder 44 freely rotatable relative to the inner cylinder 42 by ball bearings 46, but rigidly connected to the inner cylinder for axial movement therewith.

The ball nuts 38 and 40 are identical, each is meshed with the drive screw 22 and each is driven by a respective motor 32 or 34. Thus, as illustrated in FIG. 2, the pulley 32c driven by the belt 32b from (FIG. 1) the motor 32 is rigidly secured to the inner cylinder 42 of the ball nut 32 for applying torque against the inner cylinder 42 in response to torque generated by the motor 32. Similarly, torque generated by the motor 34 is applied to the inner cylinder 42 of the ball nut 40 by means of the belt pulley 34c rigidly secured to the inner cylinder 42 of the ball nut 40.

The use of single ball nuts of the type shown in FIG. 2 for driving lathe-type apparatus is known and, using but one ball nut 38 or 40, the apparatus shown in FIG. 2 could be used for driving a known prior art lathe-type carriage. Considering only the ball nut 38, for example, and assuming the absence of the ball nut 40, the outer cylinder 44 of the ball nut 38 is rigidly coupled to the carriage 20 (see, also, FIG. 1) and, upon operation of the motor 32 for causing rotation of the inner cylinder 42 of the ball nut 38, the ball nut 38 is axially screwed along the drive screw 22 for axially advancing the carriage 20. The motor 32 is reversible, and travel of the carriage 20 in both directions is obtained under control of the single motor 32.

In the embodiment of the invention illustrated in FIG. 2, both nuts 38 and 40 are present, both are respectively rigidly connected to the two pulleys 32c and 34c which, in this embodiment, are rigidly engaged (FIG. 1) to the drive shafts of the respective motors 32 and 34. As previously noted, both motors are, at times, simultaneously powered for developing torques tending to rotate the two ball nuts 38 and 40 in opposite directions. No belt slippage occurs, and all the rotatable parts, i.e., the respective pairs of pulleys 32a,32c and 34a,34c, and the two belts 32b and 34b, are all rotatable in directions corresponding to axial movements of the two ball nuts 38 and 40 in the same direction. What occurs is if, for example, the motor 32 is energized to generate a higher torque than that generated by the motor 34, all directions of movement in the drive train are determined solely by the direction of turning of the motor 32. Thus, if the motor 34 (of lower torque) would, if energized in the absence of the motor 32, turn in a direction to rotate its drive shaft clockwise and to attempt to rotate the ball nut 40, e.g., clockwise for advancing the carriage to the left, owing to the higher torque of the motor 32, the torque applied by the motor 34 is overcome and the greater or net torque applied to the ball nut 38 causes actual rotation of the nut 38 (in this example) counter clockwise and actual advance of the carriage 20 to the right. Because the ball nut 40 is rigidly threaded on the drive shaft 22, actual movement of the carriage 20 to the right causes actual counter clockwise rotation of the ball nut 40. Thus, while the torque generated internally of the motor 34 coupled to the ball nut 40 is in a direction to cause clockwise rotation of the drive shaft of the motor 34, the counterclockwise rotation of the ball nut 40 (as caused by the rightward movement of the carriage 20 along the drive shaft 22) causes counterclockwise rotation of the drive shaft of the motor 34. The motor 34 is thus driven backwards in a direction opposite to the direction of torque being generated by the motor 34. The "counter direction" torque produced by the motor 34 acts as a drag against the "forward direction" torque of the motor 32 driving the ball nut 38 to the right.

A principle use of the "counter torque" (i.e., that torque being produced by the motor not actually driving the carriage 20) is to eliminate backlash in the drive train at the time of reversal of direction of the carriage. In the absence of a two motor drive system, as herein disclosed, a typical practice is, as previously noted, to rotate a carriage mounting ball nut by a single, reversible motor. As known, in the absence of special means for preventing backlash, some degree of looseness in the drive train of such single motor systems is inevitably present leading to backlash at the time the carriage first comes to a stop and begins travel in the reverse direction. For example, during movement of a single motor driven carriage to the right along a drive screw, all engaging parts of the drive train are firmly pressed against one another and are at least slightly strained (distorted) in directions corresponding to the direction of force transmittal along the drive train. When the carriage comes to a stop and the single motor drive shaft begins to turn in the reverse direction, actual movement of the carriage does not begin until all the strains in the right-hand, force transmitting direction are reversed, and any gaps between surfaces providing force transmittal in the left-hand direction are closed. This takes time and, more significantly, is a function of the tolerances actually present when the drive train is first assembled and how these tolerances change with time and wear of parts. Such factors are not known and, even if measured at any time, change with time. Thus, during the period when backlash is delaying positive transmittal of movement causing forces, the movement of the carriage is not under direct control and is randomly variable. Such unknown and uncontrolled movements of the single motor driven carriage, at the instants of reversal of direction of the carriage, can lead to undesirable variations in the processing of a workpiece or a workpiece processing tool mounted on the carriage.

In accordance with the present invention, however, by energizing one of the two motors not actually advancing the carriage just shortly before the carriage reaches the end of its travel in a "forward" direction, a "reverse" direction force is created which causes the force transmitting parts of the drive train associated with the reverse direction driving motor to be in rigid force transmitting relationships. Thus, at the instant when the carriage stops travel in the first direction and is to start travel in the reverse direction, no time delay occurs for the transmittal of the reverse direction force which is already being transmitted prior to the stoppage of the carriage.

Another problem associated with changing direction of travel of a carriage is that the carriage must come to a complete halt, even if only for a vanishingly small instant. Standing friction is considerably higher than moving friction, and restarting of the carriage cannot occur until the reverse driving force is large enough to overcome such standing friction. Thus, with a single motor, at the instant the motor shaft begins to turn in an opposite direction, for reversing the direction of movement of the carriage, even after backlash has been overcome and reverse direction force is being transmitted through the drive train, no carriage movement begins until the level of force being transmitted increases to an amount sufficient to overcome standing friction.

In accordance with the present invention, however, by applying a reverse direction force to the carriage in a "threshold" amount greater than the force to overcome standing friction, upon removal of the forward direction driving force, a reverse direction driving force sufficiently large to overcome standing friction is already present for immediate application against the carriage.

Stating the foregoing slightly differently, the axial directions of movements of the ball nuts 38 and 40 are determined by the sum or net of the two oppositely directed forces being applied. At the end of travel of the carriage in the "forward" direction, the torque from the forward direction driving motor is reduced while the torque from the drag producing motor is increased. Because no backlash is present (as previously described), the rates of torque change are a function solely of the speed control parameters of the motors. When the opposing torques are equal, the net torque on the two ball nuts 38 and 40 is zero and the carriage has come to a complete halt. Although the net torque on the two ball nuts is zero, the actual level of torque being applied by the reverse driving motor is, as described, above the level necessary to overcome standing friction and, dependent solely upon the rate of decrease of torque from the forward driving motor, a large reverse direction driving torque is essentially immediately available for reverse driving the carriage.

As above-described, stoppage and re-starting of travel of the carriage is a function of the rates of change of torque from two motors. Using a single motor, stopping and re-starting the carriage involves bringing the motor torque completely to zero and then raising the torque level, in the opposite direction, sufficiently high to overcome standing friction. With two motors, stoppage and re-starting can occur while the torque from the forward direction driving motor is still relatively high, as determined by the magnitude of torque from the reverse driving motor, and essentially independent of the subsequent further reduction in torque of the forward direction motor.

For example, if the torques for driving the carriage in either direction are 10 ft-lbs, cross-over of torques (for zero net torque) can occur at a high level, e.g., at 9 ft-lbs from each motor, or at a low level, e.g., at 3 ft-lbs (but always, as described, at a level above that necessary for overcoming standing friction). Provided the motor providing the drag function is turned on only shortly before the carriage reaches its turn-around point, it is generally preferable that a high cross-over torque level is used. Then, only a minimum time delay is present before the reverse direction torque reaches the illustrative steady-state level of 10 ft-lbs.

Turning on the reverse direction torque applying motor only shortly before the carriage reaches the end of its forward direction travel is most economical in the use of electrical power.

However, in a preferred embodiment, both motors are on constantly, throughout the forward and backward travel of the carriage, but with one motor drive train providing a higher torque than the other motor drive train for driving the carriage in a "forward" (or "backward") direction, and the other motor drive train applying a relatively small torque opposing the forward (or backward) direction driving torque. The presence of the small (and constantly applied) opposing torque tends to provide a more uniform rate of travel of the carriage. The speed of travel of the carriage is a function of the net of the driving torques and the system friction. In the prior art, using but one, reversible driving motor, the speed of travel is a function only of the motor driving torque and the system friction. While the motor driving torque is quite accurately controllable, the friction of the system tends to be variable, particularly with time and with variable wear. Thus, during driving of the carriage with but a single motor, the sudden encountering of a change in friction in the system can result in a lurching of the carriage. Such lurching is significantly decreased using two opposed driving torques because the opposing torque serves as a brake against sudden lurchings in response to decreases of friction in the system.

In another embodiment, not illustrated, the two separate ball nuts 38 and 40 shown in FIG. 1 are combined as a single ball nut identical to either ball nut 38 or 40 but with both motor driven belt pulleys attached at opposite ends of the outer cylinder 42. Quite, simply, in FIG. 2, the two inner cylinders 42 of the two ball nuts 38 and 40 would be integrally connected together. Operation is the same as previously described. With both motors 32 and 34 energized, the motor providing the higher torque determines the direction of movement of the carriage while the other motor provides a braking force.

As described, each motor 32 and 34 provides two functions; one being to drive the carriage along the drive (lead) screw and the other being to oppose the motion of the carriage. It is possible, however, to separate the two functions. For example, in the embodiment shown in FIG. 1, the drive screw 22 is stationary and power for advancing the carriage is provided through the two motors. Alternatively, the drive screw 22 can be rotated by an external means, not shown, whereby it is the rotation of the drive screw which provides power for advancing the carriage or the two nuts 52 and 54. In such rotating screw arrangement, while the two motors are not used for causing movement of the carriage along the drive screw, the two motors are used, as previously described, for opposing axial movements of the carriage and for reducing backlash between the drive screw and the carriage.

A situation where it might be preferable to rotate the drive (lead) screw is with an exceptionally massive carriage requiring quite large motor power for carriage movement. Thus, two quite large motors 32 and 34 would be required in the embodiment shown in FIG. 1. If the motors 32 and 34 served solely the backlash reducing function, smaller motors (movable with the carriage) could be used. However, means would still have to be provided for reducing backlash between the drive screw rotating motor and the drive screw. With the stationary drive screw arrangement shown in FIG. 1, all backlash in the power drive trains between the carriage moving power sources (e.g., the motors 32 and 34) and the carriage is essentially removed.

Although the invention has been described in connection with linear motion of a carriage, controlled rotary motion can also be utilized. For example, if the two ball nuts 38 and 40 shown in FIG. 2 are replaced with two separate and spaced apart hubs of a single rotatable wheel fixedly secured to a common shaft rotatable under control of the two motors 32 and 34, the two motors would function to provide controlled, reversible direction of the wheel without backlash and with minimal uncontrolled lurchings in response to instantaneous variable loading of the wheel. (A more simple arrangement is a single hub driven by two motor driven belt pulleys secured at axially opposite ends of the single hub.)

In general, known types of force generators can be used in the implementation of the invention. A.C. induction motors, d.c motors or even stepper motors under control of known power controlling systems can be used; similarly, hydraulic, pneumatic motors and the like can be used.

Figure 3:
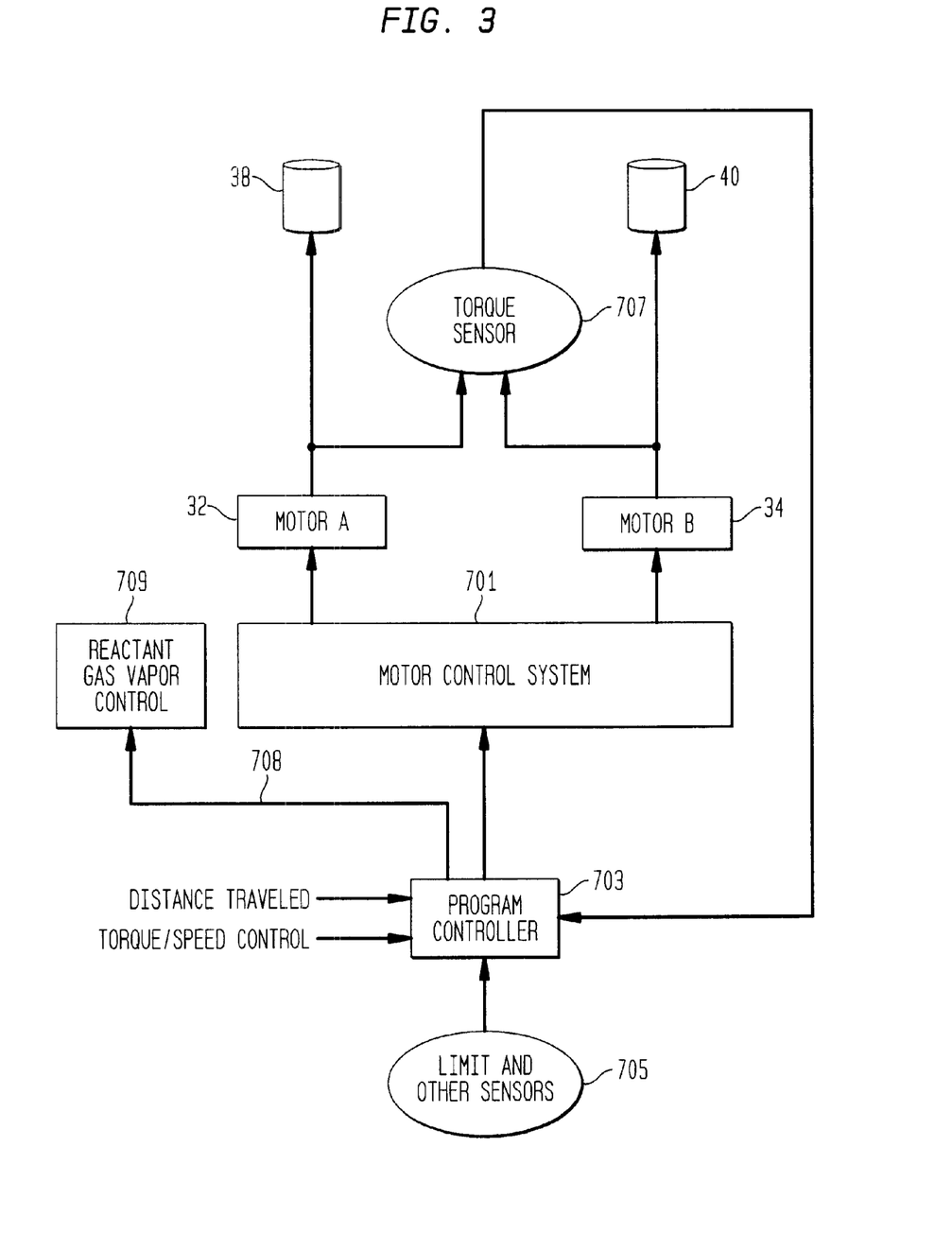
FIG. 3 is a block diagram of a motion control circuit in accordance with the invention.

By way of example of a suitable control system, FIG. 3 is a block diagram showing electrical controls for the motors 32 and 34. The motor control circuit 701 supplies electrical power to the motors. In the illustrative process shown, for making an optical fiber preform, the motor control circuit is controlled by a micro-controller or programmer 703 preprogrammed with information as to the distance the carriage 20 (FIG. 1) must travel along the tube, permissible rates of increase of the speed and/or torque of the motors and the desired speed at which the carriage is to go in the steady state condition along most of the length of the tube 10. Alternatively, the system may include optical and/or electronic sensors 705 to sense when the carriage nears or reaches the ends of the travel path. These sensors 705 then provide signals to the programmer 703 to initiate the application of power to the motors such that the carriage decelerates, then stops, and then accelerates in the opposite direction.

The system embodying the invention may also include a torque sensor circuit 707 to sense the differential torque produced by the motors 32 and 34. To prevent backlash and/or dither and/or jerky motion, it is desirable that the torques of the motors do not change too quickly relative to one another. To achieve this result, a differential torque sensor 707 is used and its output is fed back to the programmer 703 to supply correct control signals to the motor control circuit 701 which supplies the electrical power to the motors.

In systems for making fiber optic preforms embodying the invention, there is much greater control over the formation of the glass layers within the tube 10. For example, during the time when the carriage changes direction and travels at a lower average speed, a greater degree of heat is applied to the tube. However, owing to the high degree of control in the movements of the carriage provided by the invention, the profile of the reactants and gas vapors can be modified to compensate for the rate change of movement of the carriage. This may be accomplished, for example, by means of using the output from the torque sensor 707 to supply a signal to program controller 703. Controller 703 includes circuitry for producing a signal on line 708 which is applied to reactant gas vapor control circuit 709 which controls the amount and mix of reactants and gas vapors supplied to the starter tube 10. Furthermore, since the movement of the carriage assembly is tightly controlled by the motors, a high degree of compensation is possible. Thus, in FIG. 3, the programmer 703 produces an output signal on line 708 which is supplied to a reactant and gas vapor control 709 which controls the amount of reactants and gas vapors applied to the tube based upon the known rates of movement of the carriage at the ends of the path of carriage travel. Thus, uniform processing is obtained in spite of the inevitable, but known, carriage speed changes.

It should also be appreciated that the torque sensor 707 may be used to sense any momentary (and unexpected) hesitation in the travel of motors A and/or B and provide an indication thereof to program controller 703 which can then supply control signals to the motor control system 701 for controlling the power applied to motors A and/or B and their ensuing movements. Concurrently, the program controller 703 can supply a signal via line 708 to reactant gas vapor control 709 to control the amount and mix of the gases being supplied to the preform tube 10.

It should also be appreciated that in systems embodying the invention, the program controller may be preprogrammed and/or may be programmed to respond to information corresponding to certain inputs such as distance traveled and/or torque/speed control. Photo sensors and/or other limit sensors 705 may also be used to detect the end of travel and the motion of the preform tube and supply corresponding signals to the program controller, to take corrective action whenever necessary.

While the invention has been described in detail herein in accordance with certain embodiments thereof, many modifications and changes therein may be effected by those skilled in the art. Accordingly, it is intended by the appended claims to cover all such modifications and changes as fall within the true spirit and scope of the invention.

What is claimed is:

1. Apparatus for forming optic fiber layers within a preform tube extending between first and second points, comprising:

means for supplying reactants and gas vapors to the preform tube at the first point with exhaust gases escaping from the preform tube at the second point;

a high intensity heat source for selectively supplying a high intensity heat along the length of the preform tube; and a first motor coupled to said high intensity heat source and a second motor coupled to said high intensity heat source, said first and second motors being, respectively, part of first and second motorized assemblies coupled to the high intensity heat source; said first and second motors for propelling the high intensity heat source back and forth between said first and second points and for controlling the back and forth movement of the high intensity heat source so it travels with substantially no backlash in the direction of movement as the high intensity heat source is moved back and forth between the first and second points, along the preform tube.

2. Apparatus as claimed in claim 1 wherein the preform extends in the horizontal direction, and wherein the high intensity heat source is designed to travel along a path parallel to the preform tube.

3. Apparatus as claimed in claim 1 wherein the first and second motors are powered such that each one opposes the motion of the other for causing the high intensity heat source to travel with essentially no hesitation as it is moved back and forth along the preform tube.

4. Apparatus as claimed in claim 1 wherein said means for supplying reactants and gas vapors to the preform tube at the first point includes means responsive to the movement of said first and second motorized assemblies for controlling the flow of reactants and gas vapors into the preform tube.

5. Apparatus as claimed in claim 1 wherein said first and second motorized assemblies include a motor control system for energizing and controlling the first and second motors independently of each other.

6. Apparatus as claimed in claim 1 wherein said first and second motorized assemblies include: (a) a motor control system for controlling the movement of said first and second motor assemblies; and (b) a torque sensor for sensing the torque produced by the first and second motor assemblies and producing a signal indicative thereof and for supplying this signal to the motor control system.

7. Apparatus as claimed in claim 1 wherein said first and second motorized assemblies include: (a) a motor control system for controlling the movement of said first and second motor assemblies; (b) a controller for controlling the motor control system; and (c) a torque sensor for sensing the torque produced by the first and second motor assemblies and producing a signal indicative thereof and for supplying this signal to the motor control system.

8. The apparatus as claimed in claim 1 including a controller for controlling the means for supplying reactants and gas vapors to the preform tube and the movement of the first and second motorized assemblies.

9. Apparatus for forming optic fiber layers within a starter tube extending between first and second points, comprising:

means for supplying reactants and gas vapors to the starter tube at the first point with exhaust gases escaping from the starter tube at the second point; and means for causing a high intensity heat source to be moved back and forth along the length of the starter tube for controlling the heat applied to the starter tube in order to control the thickness of the optic fiber layers formed within the starter tube, said means for causing the high intensity heat source to be moved back and forth along the length of the starter tube including a first motor coupled to said high intensity heat source and a second motor coupled to said high intensity heat source, said first and second motors for propelling said high intensity heat source back and forth between said first and second points, said first and second motors being part of respective first and second motorized assemblies, and said first and second motors being powered such that each motorized assembly opposes the movement of the other motorized assembly.

10. Apparatus as claimed in claim 9 wherein said means for supplying reactants and gas vapors to the starter tube and said means for causing a high intensity heat source to be moved back and forth along the length of the starter tube include a controller for controlling the flow of reactants and gas vapors as a function of the movement of the first and second motorized assemblies and a motor control system for controlling the movement of the first and second motorized assemblies.

11. Apparatus for forming optic fiber layers within a starter tube extending between first and second points, comprising:

means for supplying reactants and gas vapors to the starter tube at the first point with exhaust gases escaping from the starter tube at the second point;

a high intensity heat source for selectively supplying a high intensity heat along the length of the starter tube; and a first motor coupled to said high intensity heat source and a second motor coupled to said high intensity heat source, said first and second motors being, respectively, part of first and second motorized assemblies coupled to the high intensity heat source for moving the high intensity source back and forth between the first and second points and for controlling the movement of the heat source, said first and second motors being powered such that each one opposes the motion of the other for causing the high intensity heat source to travel with substantially no backlash along its direction of travel as the high intensity source is moved back and forth between the first and second points, along the starter tube.

12. Apparatus as claimed in claim 11 wherein the starter tube extends in the horizontal direction and wherein the high intensity heat source is designed to travel along a path parallel to the starter tube.

13. Apparatus for forming optic fiber layers in a starter tube having an input end and an exhaust end, said apparatus including:

means for supplying reactants and gas vapors to the input end of said starter tube;

a high intensity heat source for selectively supplying a high intensity heat along the length of the starter tube; and a first motor coupled to said high intensity heat source and a second motor coupled to said high intensity heat source, said first and second motors being, respectively, part of first and second motorized assemblies coupled to the high intensity heat source for moving said high intensity heat source along the starter tube; and motor control circuitry coupled to said first and second motors and powering said first and second motors such that each one opposes the motion of the other for causing the high intensity heat source to travel at a constant speed from a first point to a second point along the starter tube, decelerating the travel of the high intensity heat source at the second point and then bringing it to a stop, and then reversing the direction of travel of the high intensity heat source with little if any hesitation and accelerating the rate of travel until a predetermined constant speed is reached and causing it to travel at a constant speed between the second and the first point, and then decelerating the rate of travel and then bringing it to a stop.

14. Apparatus as claimed in claim 13 wherein the high intensity heat source is designed to travel along a path running parallel to the starter tube.

15. Apparatus as claimed in claim 13 wherein the first and second motorized assemblies cause the high intensity heat source to travel with little, if any, dither along the length of the tube between the first and second points, and wherein little, if any, backlash is introduced in the travel of the high intensity heat source when it is brought to a stop.

16. Apparatus as claimed in claim 13 wherein the starter tube is a glass starter tube in which fiber optic layers are formed.

17. Apparatus as claimed in claim 13 further including at least one photosensor for sensing the end of travel and wherein the at least one photosensor produces control signals for controlling the movement of the motor assemblies.

* * * * *